(12) United States Patent
Shteynberg et al.

(10) Patent No.: US 6,208,534 B1
(45) Date of Patent: Mar. 27, 2001

(54) GENERATING BIAS VOLTAGE IN A VOLTAGE CONVERTER

(75) Inventors: Anatoly Shteynberg; Dmitry Goder, both of San Jose, CA (US)

(73) Assignee: Switch Power, Inc., Campbell, CA (US)

( * ) Notice: Subject to any disclaimer, the term of this patent is extended or adjusted under 35 U.S.C. 154(b) by 0 days.

(21) Appl. No.: 09/542,626

(22) Filed: Apr. 4, 2000

(51) Int. Cl.$^7$ .................................................. H02M 3/335
(52) U.S. Cl. .................................................. 363/21; 363/49
(58) Field of Search ............................. 363/21, 131, 97, 363/49

(56) References Cited

U.S. PATENT DOCUMENTS 3,967,159 * 6/1976 Dendy et al. ........................... 363/21
4,318,168 * 3/1982 Faxon .................................... 363/21

* cited by examiner

*Primary Examiner*—Shawn Riley
(74) *Attorney, Agent, or Firm*—Flehr Hohbach Test Albritton & Herbert LLP

(57) ABSTRACT

For use with a power converter, a bias voltage generator samples a fraction of the input voltage Vin using a bias switch coupled to a tap on the power converter transformer input winding. The bias switch is driven from the same control circuit that drives the converter switch, and the fraction of Vin sampled by the bias switch is coupled to a low pass filter to generate the bias voltage Vbias. Vbias≈(Vin)·(Kf)·(Kdc), where Kf is the fractional location of the transformer tap, and Kdc is duty cycle of the power converter switch. Vbias enjoys automatic compensation against variation in Vin because the power converter will automatically compensate Kdc to correct for Vin variation. The resultant bias voltage generator requires no additional transformer winding.

22 Claims, 4 Drawing Sheets

GENERATING BIAS VOLTAGE IN A VOLTAGE CONVERTER

FIELD OF THE INVENTION

The present invention relates generally to transformer-coupled power supplies and more particularly to DC:DC power supplies that must generate a bias voltage in addition to generating an output voltage.

BACKGROUND OF THE INVENTION

Voltage converters receive an input voltage (Vin) that is AC in an AC:DC power supply, or DC in a DC:DC power supply, and generate an output DC voltage (Vout) therefrom. The Vout output voltage may be greater than Vin or less than Vin. In many applications, the input-to-output voltage conversion requires the presence of a bias voltage (Vbias) that may be different in magnitude than Vin or Vout. Vbias may be required to establish a reference voltage against which Vout is compared, or may be required to operate a feedback circuit that compares Vout against some other reference potential and changes pulse width, duty cycle, frequency, etc. of a drive signal used to generate Vout. In some circuits Vout may be +48 VDC, as is commonly required in telecommunications circuitry, but generating Vout requires a bias potential of perhaps +12V, regulated to within ±10% or so.

FIG. 1A depicts a prior art DC:DC power supply 10 that converts an input voltage (Vin) to an output voltage rectified DC voltage (Vout), and generates and uses a lower bias voltage (Vbias) in the input:output conversion. It is understood that system 10 could instead be an AC:DC power supply, in which case Vin would represent an input AC voltage after it has been rectified.

In FIG. 1A, bias voltage generator circuit 20 creates Vbias from Vin, the conversion shown generically with a Zener diode Vz, a filter capacitor C, and a resistor R. Collectively, generator circuit 20 depicts a so-called linear bias voltage generator configuration. The breakdown voltage of Vz will determine Vbias, and may commonly be about 12 VDC.

FIG. 1A, Vbias provides a DC Vbias potential to a control and driver circuit 30 (hereafter, control circuit) that modulates pulse width and/or repetition frequency of a drive signal provided to a switch Q1. As shown, switch Q1 is coupled to the low potential end of a primary winding W1 on a transformer T1, the other end of winding W1 being coupled to Vin. Primary winding W1 is commonly fabricated with a center tap (denoted as X) because a split primary winding tends to decrease transformer leakage inductance, although not all circuits make use of the center tap node.

In a fashion well known to those skilled in the relevant art, switch Q1 opens and closes in response to a drive signal from circuit 30. When Q1 is closed Vin is impressed across the input or primary transformer winding W1, and essentially Vin is sampled or chopped. The resultant chopped signal is inductively coupled to the output or secondary transformer winding W2, where the signal is rectified and filtered to yield a DC voltage, Vout. FIG. 1A depicts a typical output configuration comprising a secondary winding W2, across which is placed series-coupled R-C snubbers to reduce transient peaks. AC voltage presented to the secondary winding is rectified by diodes D1, D2 and the output low-pass filter, here comprising inductor L1 and output capacitor C1. A load (not shown) is coupled to the Vout node.

Magnitude of Vout can be altered by changing duty cycle of the drive signal provided by circuit 30 to switch Q1. (In certain topologies, Vout magnitude can also be altered by changing the repetition rate or frequency of the drive signal to switch Q1.) Such drive signal changes are typically responsive to a signal fedback from Vout via a feedback circuit, shown generically as path 50. As a result, circuit 30 can make compensating changes in the drive signal delivered to the input of switch Q1. For example, if the load or other factors cause Vout to decrease, feedback via path 50 can cause circuit 30 to increase duty cycle of the drive signal to switch Q1 to increase magnitude of Vout.

Although bias generator circuit 20 functions well enough to generate Vbias, such linear regulators can be very inefficient in terms of wasting electrical power and dissipating heat. Further, if Vin should increase in magnitude, the magnitude of Vbias may remain constant, but substantial additional voltage may now be dissipated across resistor R, with resultant greater inefficiency. In some applications, Vin may remain constant, but may so large in magnitude, +300 VDC for example, that excessive dissipation across R (or equivalently functioning components) may result. On the other hand, if Vin decreases too much, the magnitude of Vbias may vary unacceptably. In short, prior art bias circuits that use a linear regulator are simply too inefficient, and do not provide efficient compensation against changes in magnitude of Vin.

FIG. 1B depicts a second method used in the prior art to generate a bias potential. In this configuration, power transformer T1 has been modified to add an auxiliary winding (Waux). The turns ratio (Naux:Npri) between Waux and primary winding W1 determines magnitude of the potential to be rectified by diodes Da1, Da2, inductor La, and capacitor Ca1. In many common applications, the turns ratio is such that a rectified Vbias of about +12 VDC is generated. Note that the converter system shown also includes a startup circuit 40 to ensure proper operation of circuit 30 during and following application of input potential Vin.

While bias generating circuit 20' in FIG. 1B can be more energy efficient than circuit 20 in FIG. 1A, the luxury of adding auxiliary winding Waux may not always be available. For example, T1 may lack the necessary additional connection pins on its winding bobbin with which to bring out the two leads associated with Waux. Although one might add the Waux winding and simply let the wire leads dangle if no additional pins were available, this approach is impractical in a serious design for a production circuit. But even if additional pins were available, having to include an additional Waux winding adds expense and weight, requires more copper wire, and undesirably adds to the overall form factor of T1. Further, some circuits implement T1 as a planar transformer that is fabricated as part of a printed circuit board containing much of system 10. Such planar transformers are difficult to modify, especially where the geometry of conductive traces on the printed circuit board is a consideration in the design of transformer T1. Thus, although circuit 20' in FIG. 1B can be used to generate Vbias, in some applications form factors associated with T1 and/or circuit economy preclude generating Vbias with an auxiliary winding.

To summarize, there is a need for a bias voltage generator for use with AC:DC or DC:DC voltage converters that is more efficient than a linear bias generator. Such a bias voltage generator should not require an auxiliary converter transformer winding (with attendant cost, weight, and bulk) or require additional pin-out connections for the converter transformer. In addition, such bias generator should provide a measure of self-regulation such that as Vin varies, Vbias remains substantially constant. Finally, such bias voltage generator should function without requiring additional drive signals beyond what is already present in the voltage converter.

The present invention provides such a bias generator.

SUMMARY OF THE INVENTION

The present invention is used with a conventional forward power converter in which Vin is coupled to one end of a converter transformer primary winding, and the low potential end of the primary winding is coupled to a converter switch that is driven with a duty cycle Kdc by a control circuit. In a first embodiment, the present invention samples a fraction Kf of the Vin voltage using a bias switch to obtain a sampled version of the desired bias voltage Vbias. The sampled voltage is then filtered to provide the desired Vbias, whose magnitude is proportional to the product (Vin)·(Kf)·(Kdc).

Preferably the fraction Kf of Vin is obtained by providing a tap on the transformer primary winding at a fraction Kf of the total number of turns on the winding, e.g., Kf=0.5 represents a center-tap. A preferably solid state bias switch is coupled in series between the Kf tap and the input to a low pass filter, whose output is Vbias. The bias switch is turned on and off, synchronously with the converter switch, preferably in response to the drive signal generated by the control circuit.

Feedback that is present in the voltage converter normally causes the control circuit to pulse width or otherwise modulate the converter switch drive signal (e.g., Kdc) to maintain a constant Vout even if Vin changes. As noted, Vbias≈(Vin)·(Kf)·(Kdc). Thus magnitude of Vbias will benefit from automatic compensation against changes in Vin. Further, this compensation is obtained without requiring having to generate additional control drive signals, without having to add auxiliary windings to the converter transformer, and without excessive heat dissipation. A desired magnitude of Vbias may be generated by designing the underlying voltage converter system such that the product (Vin)·(Kf)·(Kdc) will produce the desired magnitude of Vbias. It is not necessary that Kf=0.5, and in practice typical values for Kf are $0.3 \leq Kf \leq 1.0$.

A second preferred embodiment avoids the difficulty associated with turning-on a so-called high-side switch, in which a bias switch is series-coupled with Vin at the high potential end of the converter transformer primary winding. In this embodiment a preferably solid state bias switch is driven from the low voltage side of the primary transformer winding, in essence using a control signal referenced to ground rather than to Vin. The bias switch is again coupled in series between the Kf tap on the converter transformer primary winding and the input to the low pass filter. However in this embodiment, the drive signal for the bias switch is taken from the junction of the converter switch and the low potential end of the primary winding.

Other features and advantages of the invention will appear from the following description in which the preferred embodiments have been set forth in detail, in conjunction with the accompanying drawings.

DETAILED DESCRIPTION OF THE PREFERRED EMBODIMENTS

Figure 2:
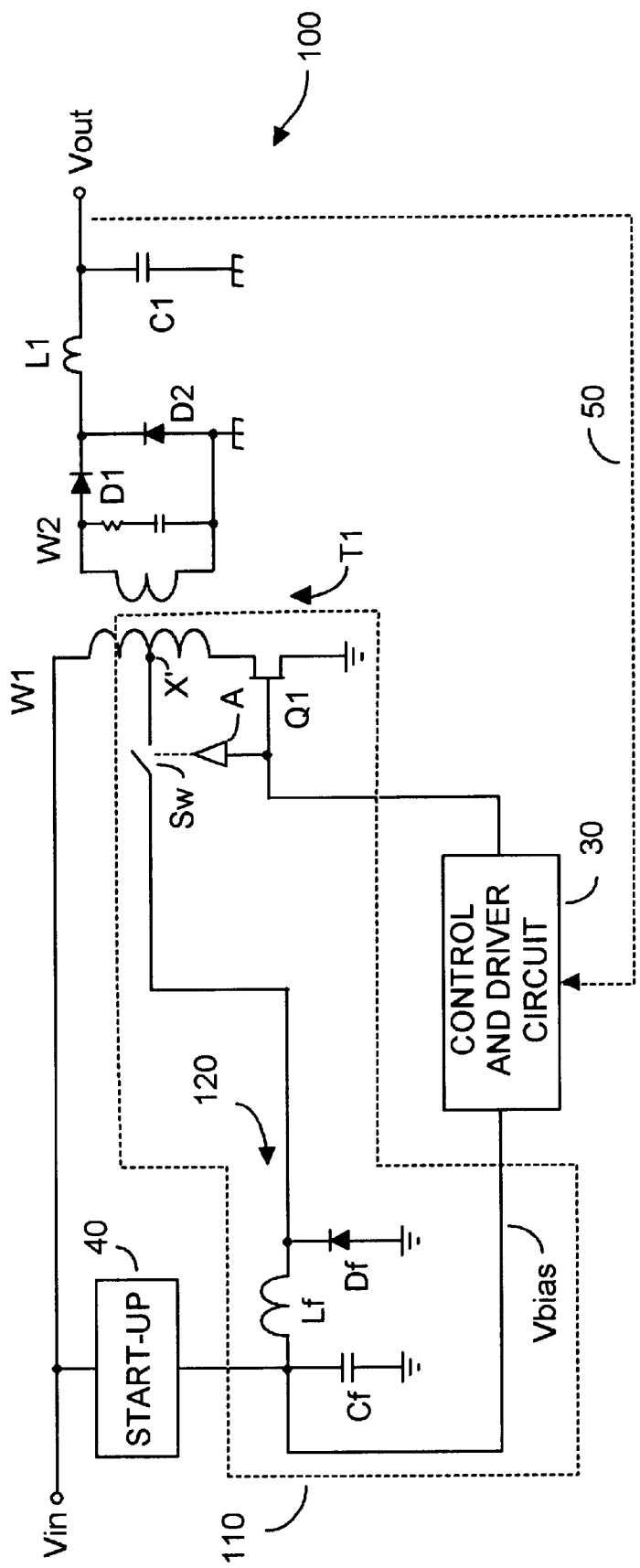
FIG. 2 depicts a voltage converter system with a bias voltage generator, according to a first embodiment of the present invention.

FIG. 2 depicts a generic voltage converter system 100 that receives an input voltage Vin and converts that voltage to an output voltage Vout, whose magnitude may be greater than or less than Vin. A converter transformer T1 essentially separates the input side from the output side of the converter system. Similar to what was described with respect to prior art systems 10, a converter switch Q1 is turned-on and turned-off with a duty cycle (denoted Kdc) by a drive signal output from control circuit 30. As noted, circuit 30 typically modulates pulse width and/or frequency in response to a signal fedback via path 50 from Vout. A start-up circuit 40 is normally provided to ensure safe and reliable start-up operation of system 100.

Figure 1A:
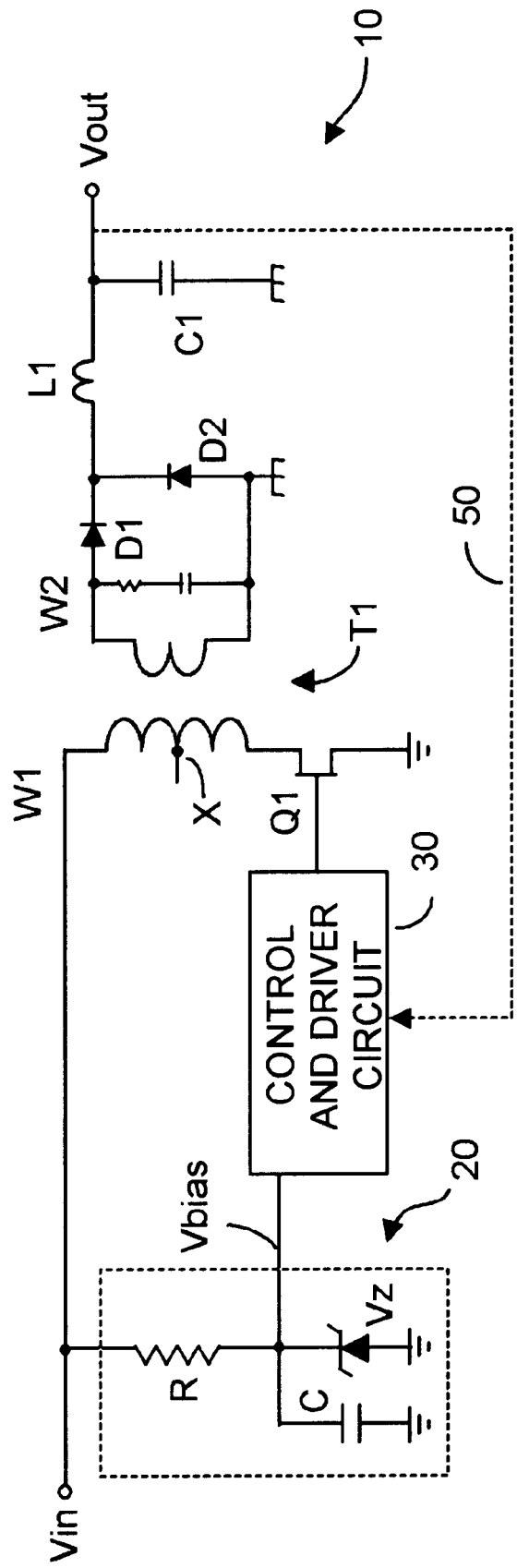
FIG. 1A depicts voltage converter system with a linear bias voltage generator, according to the prior art.
Figure 1B:
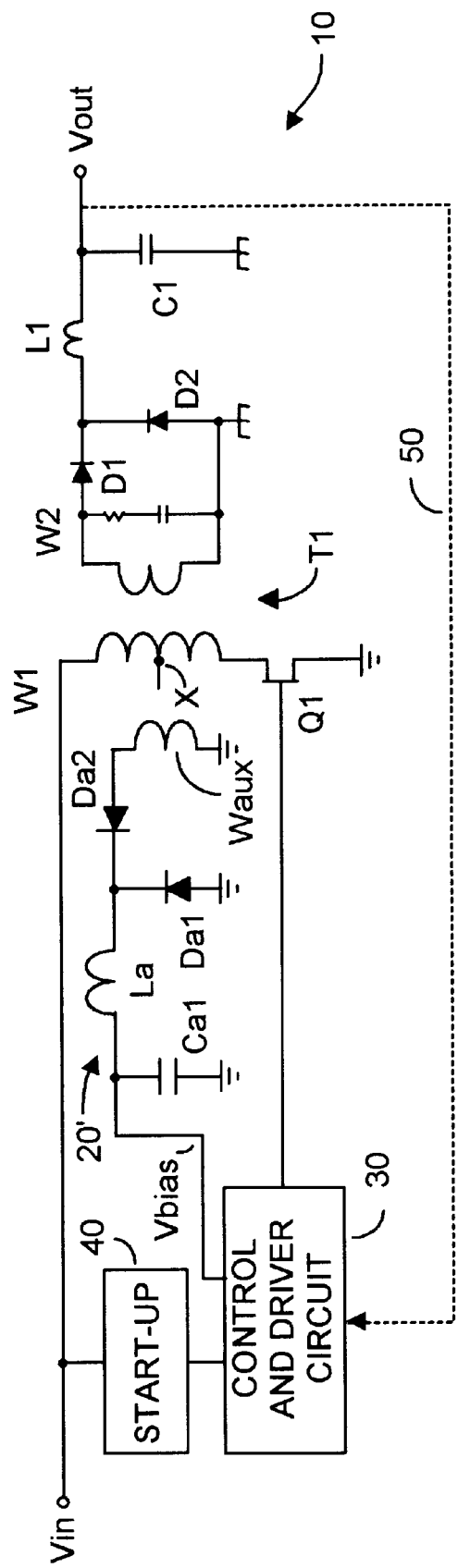
FIG. 1B depicts a voltage converter system with a dedicated auxiliary transformer winding used to generate a bias voltage, according to the prior art.

As was the case in the prior art systems shown in FIGS. 1A and 1B, control circuit 30 or perhaps other circuitry (not shown) typically requires a bias voltage Vbias that must be generated. In the configuration of FIG. 2, a bias voltage generator circuit or system 110 is provided that overcomes the various shortcomings in prior art bias voltage generators in generating the desired Vbias.

Bias generator 110 includes a bias switch Sw that is coupled to receive a fraction Kf of Vin. In FIG. 2, Sw is coupled to the resultant potential Kf·Vin via a tap X' on the primary winding W1 of the converter transformer T1. The high potential end of W1 is coupled to Vin, and the low potential end of W1 is coupled to a converter switch Q1 that is switched-on and switched-off with a duty cycle Kdc responsive to control signals from circuit 30. If winding W1 has a number of windings of wire equal to N1, Kf will represent the portion of the windings between the Q1-end of W1 and the tap position X'. By way of example, if N1=500, and the tap X' is at 350 turns up from the Q1-end of W1, then Kf=$^{350}/_{500}$=0.7. If, for example, W1 is center-tapped, with half of the N1 windings above and half of the N1 windings below then tap, then Kf would be 0.5. Although many off-the-shelf converter transformers T1 have center-a tapped primary winding (e.g., Kf=0.5), the present invention is not restricted to use with center-tapped primary winding transformers. Further, a converter may be designed in such a manner that Kf=1.0, or such that there is no need to split the primary transformer winding. Indeed, practical values for Kf are in a range of about $0,3 \leq Kf \leq 1.0$.

As driver circuit 30 switches converter switch Q1 on and off with a duty cycle Kdc, the voltage present at tap X' will be proportional to (Vin)·(Kf)·(Kdc). Preferably bias switch Sw is a solid state switch having an input lead coupled to tap X', which thus couples at least a fraction Kf of Vin through the primary transformer winding to the bias switch. Sw has a drive lead coupled to a point in system 100 to be responsive to the drive signal generated by circuit 30. Sw also has an output lead at which a sampled voltage is present proportional to (Vin)·(Kf)·(Kdc), which voltage represents an unfiltered Vbias signal.

The drive signal to bias switch Sw advantageously is generated by the same control circuit 30 that drives converter switch Q1, although in some instances an driver A may be used to provide any necessary phase inversion and/or buffering. The drive lead of bias switch Sw need not be coupled directly to the output of control circuit 30, as it suffices if Sw is driven by a signal present in system 100 that is responsive to the output generated by control circuit 30.

As shown in FIG. 2, the bias switch sampled portion of Vin is coupled to the input of a filter circuit 120, shown here as inductor Lf, capacitor Cf. A free-wheeling diode Df is also shown in FIG. 2, to provide a path for current in the primary transformer winding W1 when converter switch Q1 is open. Collectively Lf and Cf form an LC lowpass filter that rectifies the portion of Vin that is sampled by bias switch Sw. The output from filter 120 is the desired bias voltage Vbias, shown in FIG. 2 as powering control circuit 30. As noted, magnitude of Vbias is given by:

$$Vbias \approx (Vin) \cdot (Kf) \cdot (Kdc)$$

By way of example, assume that nominal Vin is +48 VDC and that control and driver circuit 30 (or indeed any other circuit associated with system 100) requires Vbias≈+12 VDC. The design of system 100 will of course take into account the desired magnitude of Vout, given Vin=+48 VDC. For a given turns ratio (Nprimary:Nsecondary) between primary and secondary transformer T1 windings, Vout is given by:

$$Vout \approx Vin \cdot Kdc \cdot (Nsecondary/Nprimary)$$

where Kdc is the duty cycle of converter switch Q1, e.g., the percentage of the time Q1 is on compared to the period of the Q1 drive signal.

Assume that tap X' on the converter transformer winding is indeed a center tap, in which case Kf=0.5. As such, the potential at X' will be (0.5)(Vin), where Vin is assumed to be 48 VDC in the present example. Thus, the voltage sampled by bias switch Sw will be 0.5×48 VDC=24 VDC.

It is seen that if system 100 can be designed to have a nominal duty cycle Kdc of 50%, that Vbias will be about equal to 50%×24 VDC≈+12 VDC. A corresponding change can be made when specifying the turns ratio for transformer T1 such that when Vin≈48 VDC, Vout will have the desired magnitude when the duty cycle Kdc is 50%.

Assume that for whatever reason, Vin increases in magnitude. The increased magnitude will tend to increase Vout, which undesired in voltage increase is fedback via path 50 to control circuit 30. Since control circuit 30 will now want to return Vout to its nominal design value, control circuit 30 will decrease duty cycle Kdc accordingly. At the same time that Vin increased, the fraction of Vin sampled by bias switch Sw will of course increase, which would tend to undesirably increase Vbias. However the automatic reduction in duty cycle Kdc imposed by control and driver circuit 30 will tend to maintain Vbias at the desired level, e.g., +12 VDC.

In some applications, other circuit design constraints may preclude designing for a nominal duty cycle that is the value of Kdc needed to generate Vbias, e.g., Kdc=50% in the above example. In such case, where nominal duty cycle can not be designed around Vbias considerations, the location of the tap point X' on the converter transformer winding W1 would be selected based upon Vbias. In the above example, if system 100 design constraints required say a 33% duty cycle (Kdc=0.33), whereas designing around Vbias would require a 50% duty cycle, the nominal value of Vbias can still be generated simply by locating X' at a winding location 75% up from the low potential end of the primary winding, e.g., Kf=0.75. As a result, the fraction of Vin sampled by bias switch Sw would be (Kf)(Vin)=(0.75)·(Vin)=(0.75)·(48 VDC)=36 VDC. With a duty cycle Kdc of 33%, the resultant Vbias would be (Kf)·(Vin)·(Kdc), or (0.75)·(48 VDC)·(0.33), or 12 VDC.

It is seen from the above description that Vbias is generated without the power dissipation associated with linear bias generators, and without having to provide additional transformer windings, or additional pin-out connections. Further, the voltage bias generator may be driven from the same control circuit that is already present to drive the converter switch. In contrast to prior art configurations, the present invention provides Vbias with automatic compensation for changes in Vin.

In FIG. 2, bias switch Sw may be described as a high-side switch in that it is essentially in series with the high voltage portion of primary winding W1, as contrasted with the converter switch Q1, which is operated as a low-side switch. In some instances it can be difficult to drive high-side bias switches.

Figure 3:
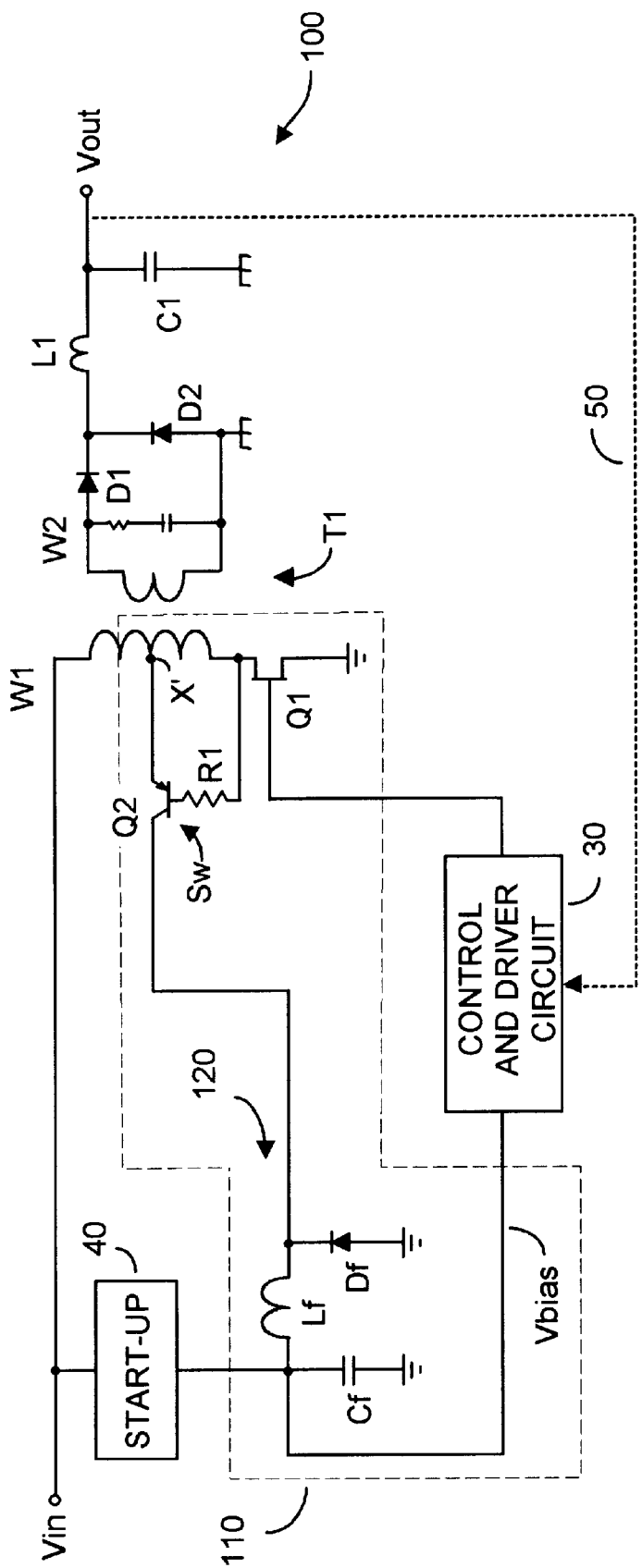
FIG. 3 depicts a voltage converter system with a bias voltage generator, according to a second embodiment of the present invention.

Turning now to FIG. 3, a so-called low-side bias switch Sw is shown, e.g., a bias switch that essentially is referenced to the low voltage side of the converter transformer primary winding W1. A PNP bipolar transistor Q2 is shown although other switch devices may instead be used, including MOS transistors.

Drive to bias switch Sw or Q2 is obtained from the lower end of primary winding W1 through a base current-limiting resistor R1. When control and driver circuit 30 outputs a drive signal that turns Q1 on, the lower end of R1 is essentially grounded, which forward biases Q2, turning Q2 on. When circuit 30 turns Q1 off, base current through R1 ceases and Q2 turns off. In this fashion a fraction of the Vin potential is sampled by bias switch Sw (Q2) and is presented to lower pass filter 120, whose output is Vbias. The same considerations described with respect to FIG. 2 apply to FIG. 3. Note that although the drive or base lead of Sw is not connected directly to the output of control circuit 30, Sw nonetheless turns on and off responsive to the output of circuit 30, since Sw is driven by a signal present at Q1 that is itself responsive to the output of circuit 30.

To recapitulate, a desired magnitude of Vbias is generated by sampling a desired fraction of Vin with a bias switch, and then preferably rectifying the sampled voltage to yield Vbias. The magnitude of Vbias generated is proportional to (Vin)·(Kf)·(Kdc), where Kf is the fractional location of the primary winding tap X', and Kdc is duty cycle with which the bias switch coupled to Vin at the winding tap X' is driven.

If desired one could of course sample the output of Sw before presenting the voltage to low pass filter 120, for example to decrease Vbias. In such configuration, an additional switch could be disposed in series between Sw and the low pass filter, and operated perhaps at a sub-multiple of the repetition rate of the output of circuit 30. This configuration could be useful where for design considerations X' must be center-tapped and system 100 must be operated at a duty cycle too high to generate a desired low voltage for Vbias. Essentially the additional switch would sample the bias switch sampled fraction of Vin to provide a decreased magnitude for Vbias.

Modifications and variations may be made to the disclosed embodiments without departing from the subject and spirit of the invention as defined by the following claims.

What is claimed is:

1. For use with a voltage converter outputting a desired magnitude of output voltage Vout over variation in output current and having a transformer with a transformer primary winding coupled between a source of Vin and a converter switch, and having a control circuit driving the converter switch with a duty cycle Kdc, a bias voltage generator to provide a bias voltage Vbias of desired magnitude, the bias voltage generator comprising:

a bias switch having an input lead coupled to said Vin through at least a fraction Kf of said primary winding, having a drive lead coupled to respond to an output of said control circuit, and having an output lead, wherein said fraction Kf is provided without adding a further winding to said transformer.

2. The bias voltage generator of claim 1, wherein said Vbias is present at said output lead with a magnitude proportional to (Vin)·(Kf)·(Kdc).

3. The bias voltage generator of claim 1, further including a filter having an input coupled to said output lead of said bias switch, and having an output providing a filtered said Vbias.

4. The bias voltage generator of claim 1, wherein said bias switch is a solid state device whose said input lead is coupled to a low potential end of said transformer primary winding.

5. The bias voltage generator of claim 1, wherein said bias switch is a bipolar transistor, said input lead is an emitter lead of said bipolar transistor, said drive lead is a base lead of said bipolar transistor coupled to a low potential end of said transformer primary winding, and said output lead is a collector lead of said bipolar transistor.

6. The bias voltage generator of claim 1, wherein said transformer is a planar transformer.

7. The bias voltage generator of claim 1, wherein Kf has a value in a range of about 0.3 to about 1.0.

8. The bias voltage generator of claim 2, wherein said filter is a low-pass filter including an inductor and a capacitor.

9. A voltage converter outputting a desired magnitude of output voltage Vout over variation in output current, comprising:

a transformer having a primary winding having a first end coupleable to a source of Vin, and having a second end;

a converter switch having an output lead coupled to said second end of said transformer primary winding, and having an input lead;

a control circuit coupled to drive said input lead of said converter switch with a duty cycle Kdc;

a bias voltage generator to provide a bias voltage Vbias, the bias voltage generator comprising a bias switch having an input lead coupled to receive a fraction Kf of said Vin, having a drive lead coupled to respond to an output of said control circuit, and having an output lead, wherein said fraction Kf is provided without adding a further winding to said transformer;

wherein said Vbias is present at said output lead.

10. The voltage generator of claim 9, wherein said Vbias has a magnitude proportional to (Vin)·(Kf)·(Kdc).

11. The voltage converter of claim 9, further including a low-pass filter having an input coupled to said output lead of said bias switch, and having an output providing a filtered said Vbias.

12. The voltage converter of claim 9, wherein said bias switch is a solid state device whose said input lead is coupled to a low potential end of said transformer primary winding.

13. The voltage converter of claim 9, wherein said bias switch is a bipolar transistor whose said input lead is an emitter lead coupled to a tap on said transformer primary winding representing a fraction Kf of total turns on said transformer primary winding, whose said drive lead is a base lead coupled to a junction of said transformer primary winding and said converter switch, and whose said output lead is a collector lead.

14. The voltage converter of claim 9, wherein said transformer is a planar transformer.

15. The voltage converter of claim 9, wherein Kf has a value in a range of about 0.3 to about 1.0.

16. For use with a voltage converter outputting a desired magnitude of output voltage Vout over variation in output current and having a transformer with a primary winding coupled between a source of Vin and a converter switch, and having a control circuit driving the converter switch with a duty cycle Kdc, a method of generating a bias voltage Vbias in which changes in Vin are at least partially compensated for:

sampling at least a fraction Kf of said Vin, said sampling being accomplished without adding a further winding to said transformer;

wherein the sampled said fraction of Vin provides said Vbias.

17. The method of claim 16, wherein said Vbias as a magnitude proportional to (Vin)·(Kf)·(Kdc).

18. The method of claim 16, wherein said sampling is synchronous with driving of said converter switch.

19. The method of claim 16, wherein sampling said fraction Kf includes forming a tap on said transformer primary winding at a position representing Kf of total turns on said winding, and coupling a bias switch to said tap.

20. The method of claim 16, wherein magnitude of said Vbias is determined by controlling magnitude of at least one of (i) Vin, (ii) Kf, and (iii) Kdc.

21. The method of claim 16, further including filtering said sampled said fraction.

22. The method of claim 16, wherein sampling includes providing a solid state bias switch having an input lead coupled to receive said fraction Kf of said Vin, having a drive lead coupled to respond to an output signal from said control circuit, and having an output lead at which said sampled said fraction of Vin is present.

* * * * *